United States Patent [19]

Shimazaki

[11] Patent Number: 4,987,498
[45] Date of Patent: Jan. 22, 1991

[54] METHOD OF FORMING HALFTONE SCREEN

[75] Inventor: Osamu Shimazaki, Kanagawa, Japan

[73] Assignee: Fuji Photo Film Co., Ltd., Kanagawa, Japan

[21] Appl. No.: 230,805

[22] Filed: Aug. 10, 1988

[30] Foreign Application Priority Data

Aug. 12, 1987 [JP] Japan ................... 62-202175

[51] Int. Cl.$^5$ .......................................... H04N 1/40
[52] U.S. Cl. .................... 358/456; 358/429; 358/448
[58] Field of Search ............ 358/283, 429, 448, 455, 358/456, 457, 465, 462

[56] References Cited

U.S. PATENT DOCUMENTS

| 4,149,194 | 4/1979 | Holladay | 358/283 |
|---|---|---|---|
| 4,245,258 | 1/1981 | Holladay | 358/283 |
| 4,251,625 | 2/1981 | Sakamoto | 358/283 |
| 4,350,996 | 9/1982 | Rosenfeld | 358/75 |
| 4,486,788 | 12/1984 | Yamada | 358/283 |
| 4,547,814 | 10/1985 | Hirosawa | 358/283 |
| 4,680,720 | 7/1987 | Yoshii | 358/283 |
| 4,692,879 | 9/1987 | Ikuta | 358/283 |
| 4,758,897 | 7/1988 | Hiratsuka | 358/283 |
| 4,780,768 | 10/1988 | Tomohisa | 358/283 |

FOREIGN PATENT DOCUMENTS

| 2026283 | 1/1980 | United Kingdom . |
| 2098022 | 11/1982 | United Kingdom . |
| 2155728 | 9/1985 | United Kingdom . |

Primary Examiner—Edward L. Coles, Sr.
Assistant Examiner—Jerome Grant, II
Attorney, Agent, or Firm—Sughrue, Mion, Zinn, Macpeak & Seas

[57] ABSTRACT

When converting a continuous-tone image into a halftone dot image based on halftone screen signals, a screen angle is defined as a rational tangent thereof to establish a basic periodic portion of the halftone screen signals, and the basic periodic portion is periodically generated to form a halftone screen which covers an entire scanned region of the continuous-tone image wherein the periodic portion includes a dot composed of an integral number of dot data items wherein the dot comprises four respective points defined at corners where a vertical distance l between an uppermost point and a leftmost point is defined by $l = L \cos^2\theta \tan\theta$ where $\theta$ is the screen angle and L is a marginal edge of the basic periodic portion into which a side of the dot is projected. Minimum unit dot data items determined by the screen angle and/or a dot resolution level are prepared, and the dot data items are generated in a sequence which is established based on said screen angle and/or said dot resolution level to constitute the basic periodic portion wherein the dot data items represented by address signals X,Y are converted into dot data items represented by address signals x,y which are defined by:

$$x = \mathrm{Mod}(X + F(Y), Nx)$$

$$y = \mathrm{Mod}(Y, Ny)$$

where Nx, Ny are numbers of dot data items of the basic periodic portion in the X,Y directions respectively, F(Y) is an address offset number and Mod is a modulo operator.

6 Claims, 6 Drawing Sheets

METHOD OF FORMING HALFTONE SCREEN

BACKGROUND OF THE INVENTION

The present invention relates to a method of forming a halftone screen, and more particularly to a halftone screen forming method which, when converting a continuous-tone image into a halftone dot image based on electrically generated halftone screen signals, minimum units of halftone dot data determined by screen angles and a dot resolution level to construct a basic periodic portion of the halftone screen signals are successively generated.

Recently, image scanning, reading, and recording apparatuses have been widely used in the field of printing and graphic art for electrically processing image information of originals to produce original film plates in an effort to simplify the entire process and improve the quality of printed images.

The image scanning, reading, and recording apparatuses are basically constructed of an image input unit, an image processing unit, and an image output unit. In the image input unit, an original or subject bearing image information is delivered to a predetermined image reading position. Next the original is scanned by a laser beam or the like, and the image information of the original is converted into an electric signal representative of different intensities of reflected laser light. The photoelectrically converted image information is then processed in the image processing unit for tone conversion, outline emphasis, or the like according to platemaking conditions. The image information which is processed by the image processing unit is thereafter fed to the image output unit in which it is converted again into a light signal such as a laser beam. The light signal is applied to a recording medium of a photosensitive material to record the image thereon. The image on the recording medium is then developed by a developing device, after which the recording medium is used as an original film plate for printing or the like.

Where an original to be printed or reproduced bears a continuous-tone image such as a photograph or a painting, it is necessary to break up the original image into halftone dots in order to reproduce image tone gradations clearly. More specifically, a continuous-tone image is converted into a halftone dot image which is composed of closely spaced dots of different sizes according to gradations of density of the image. One method of breaking up a continuous-tone image into halftone dots is to apply a light signal commensurate with the continuous-tone image to a recording medium through a contact screen having a vignetted dot pattern. The aforesaid image scanning reading and recording apparatuses employ a process for electrically generating halftone screen signals corresponding to such a contact screen and for forming a halftone dot image based on the halftone screen signals.

One conventional method of forming a halftone screen disclosed in Japanese Patent Publication No. 52-49361 will briefly be described below by way of example.

FIG. 1 of the accompanying drawings shows a basic periodic portion 2 of a halftone screen which is electrically formed. The halftone screen is composed of repetitions of one pattern including a dot 4 surrounded by four points A, B, C, D, and the minimum unit of the halftone screen is the basic periodic portion 2. The basic periodic portion 2 is constructed of eight scanning lines $S_1$ through $S_8$ arranged side by side in the auxiliary scanning direction Y. Each of the scanning lines $S_1$ through $S_8$ forms an element of the basic periodic portion 2 with a voltage signal that varies in the main scanning direction X. For forming the dot 4, for example, the voltages of the scanning lines $S_1$, $S_2$, $S_4$, $S_5$ passing through the points A through D are high, and the voltage of the scanning line $S_3$ passing through a point E is low. The voltages of the scanning lines $S_1$ through $S_5$ are selected so as to become gradually lower from the points A through D to the point E.

Halftone screen signals which are represented as voltage signals of the respective scanning lines $S_1$ through $S_8$ may be produced as analog signals. However, such half-tone screen signals are generally constructed of dot data items as digital signals for simplifying a circuit arrangement required or a signal processing operation. Where the basic periodic portion 2 is expressed by dot data items which are eight digital signals in each of the main and auxiliary scanning directions X, Y, as illustrated in FIG. 2, the basic periodic portion 2 is composed of 64 dot data items.

The basic periodic portion 2 is periodically produced frequently enough to cover an entire scanned region of the original, for thereby producing a halftone screen. The image information which is photoelectrically read by the image input unit of the image scanning, reading, and recording apparatus is reproduced as a halftone dot image on an original film plate based on the dot data items which serve as halftone screen signal s constituting the halftone screen.

When printing or reproducing a multicolor image or a high-quality monochromatic image from the halftone dot image, it is necessary to generate a plurality of halftone screens having different angles of inclination of the dots 4, i.e., different screen angles $\theta$, and superpose halftone dot images produced respectively by those halftone screens in order to prevent a moire pattern from being produced. The dot data items and their amount of the basic periodic portion 2 vary dependent on the screen angle $\theta$. For example, where the screen angle $\theta$ is 0° or 45°, the basic periodic portion 2 may be constructed of a relatively small amount of dot data items. For other screen angles $\theta$, the amount of dot data items making up the basic periodic portion 2 is considerably increased. The resolution of a half-tone dot image depends upon the data amount. Usually, a plurality of data sets constructing the basic periodic portion 2 and having different resolutions are prepared for one screen angle $\theta$. Therefore, the amount of data items that should be available by the image scanning, reading, and recording apparatus is very large. It is quite time-consuming and highly costly to prepare the necessary dot data items. Also capacity of a memory for storing such dot data must be extremely large. Consequently, the apparatus cannot be manufactured inexpensively and compactly.

SUMMARY OF THE INVENTION

It is an object of the present invention to provide a method of forming a halftone screen, when converting a continuous-tone image into a halftone dot image based on halftone screen signals, by constructing the halftone screen signal of minimum units of dot data items determined by screen angles and a dot resolution, and by extracting the dot data items in a predetermined sequence, so that the halftone screen signals may be composed of a minimal amount of data. As a result, the time and cost required to produce the dot data items may be reduced, and an apparatus for forming halftone dot images may be reduced in size.

Another object of the present invention is to provide a method of forming a halftone screen for use in converting a continuous-tone image into a halftone dot image based on halftone screen signals, by defining a screen angle as a rational tangent thereof to establish a basic periodic portion of the halftone screen signals and by periodically generating the basic periodic portion to cover an entire scanned region of the continuous-tone image. The method comprises the steps of: preparing minimum unit dot data items determined by a screen angle and/or a dot resolution level; and generating the dot data items in a sequence which is established based on the screen angle and/or the dot resolution level to constitute the basic periodic portion.

Still another object of the present invention is to provide a method of forming a halftone screen, wherein the basic periodic portion includes a dot composed of an integral number of dot data items.

Yet another object of the present invention is to provide a method of forming a halftone screen, wherein the basic periodic portion is constructed by repeatedly generating successively an integral number of dot data items which are established based on the screen angle and/or the dot resolution level.

Yet still another object of the present invention is to provide a method of forming a halftone screen, wherein the dot data items are stored in memory means, the basic periodic portion being constructed by fetching the stored dot data items from the memory means in an address sequence which is established based on predetermined address conversion data.

A further object of the present invention is to provide a method of forming a halftone screen, wherein desired dot data items are selected out of a plurality of dot data items which are established based on the screen angle and/or the dot resolution level and are stored in memory means.

A still further object of the present invention is to provide a method of forming a halftone screen, wherein the dot data items are arranged according to an algorithm which is defined based on the screen angle and/or the dot resolution level, so as to be converted into dot data items which constitute the basic periodic portion.

A yet further object of the present invention is to provide a method of forming a halftone screen, wherein the dot data items represented by address signals X, Y are converted into dot data items represented by address signals x, y which are defined by:

$$x = MOD(X + F(Y), N_X)$$

$$y = MOD(Y, N_Y)$$

where $N_X$, $N_Y$ are the numbers of dot data items of the basic periodic portion in directions X, Y, respectively, F(Y) is an address offset number with respect to the address signal Y, and MOD is a modulo operator.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
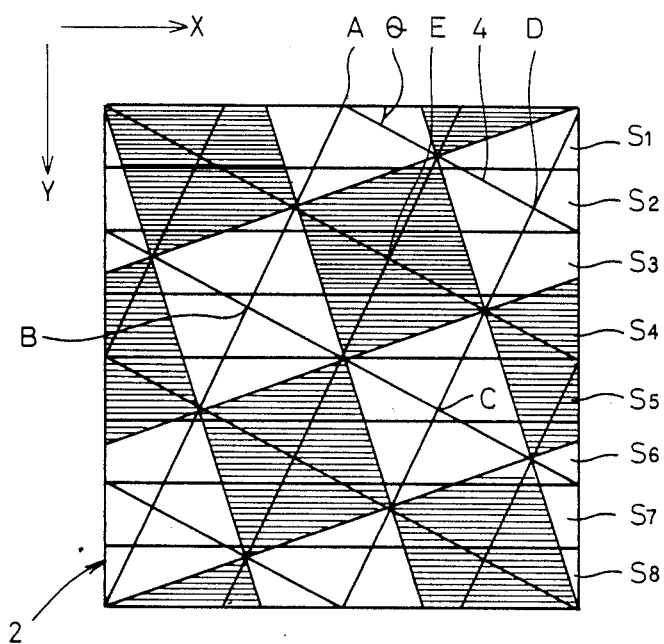
FIG. 1 is a view of a basic periodic portion of a halftone screen formed by a conventional method.
Figure 2:
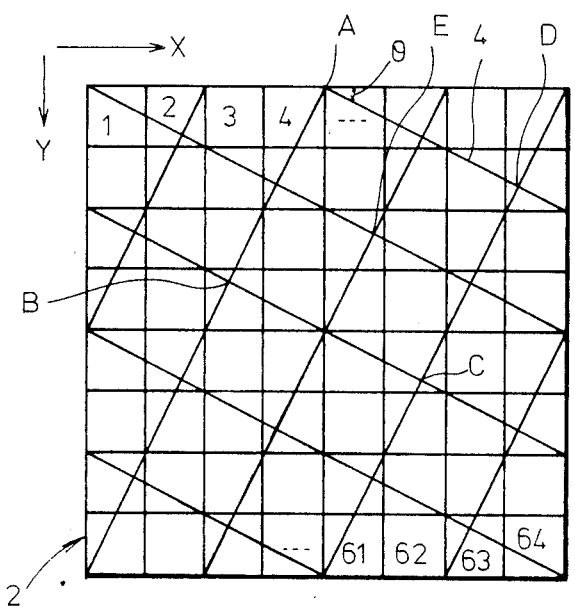
FIG. 2 is a view showing the basic periodic portion shown in FIG. 1 which is constructed of dot data items.
Figure 3:
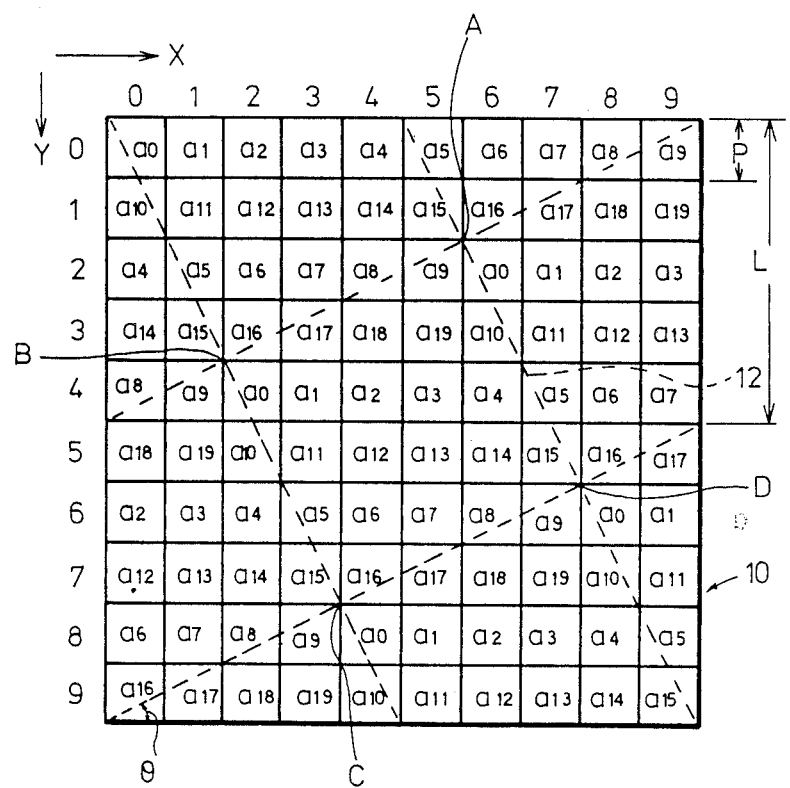
FIG. 3 is a view of a basic periodic portion of a halftone screen formed by a halftone screen forming method according to the present invention.

FIG. 3 shows a basic periodic portion 10 of a halftone screen which is constructed of 100 dot data items that are halftone screen signals. The basic periodic portion 10 includes a dot 12 surrounded by points A through D and having a screen angle $\theta$. So as to allow the basic periodic portion 10 including the dot 12 to be a minimum basic unit of the halftone screen, the screen angle $\theta$ is required to be established as a rational tangent as follows:

$$\tan \theta = M^N \tag{1}$$

where N, M are integers. Moreover, since the basic periodic portion 10 must be composed of an integral number of dot data items arranged in each of the directions X, Y, the following relationship should be met:

$$M \cdot L = \alpha P \tag{2}$$

where M.L is the length of the basic periodic portion 10 in the direction X or Y with L being the length of a marginal edge of the basic periodic portion 10 onto which a side of the square of the dot 12 is projected, P is the width of a dot block formed by one dot data item, and $\alpha$ is the number of dot data items of the basic periodic portion 10 in the direction X or Y.

It is necessary that the data items at the respective points A through D of the dot 12 be composed of the same dot data items in order to prevent a periodic pattern from being generated on a reproduced image. An integral number of dot data items should be disposed between the points A, B of the dot 12 in the directions of the arrows X, Y. Therefore, the distance l between the points A, B in the direction of the arrow Y must be given by:

$$l = \gamma P \tag{3}$$

where $\gamma$ is an integer. The same relationship holds true for the direction X. The distance l is expressed by:

$$l = L \cdot \cos^2 \theta \cdot \tan \theta \tag{4}$$

Therefore, the following equation can be derived from the equations (2), (3), and (4):

$$\frac{\gamma}{\alpha} = \frac{\tan\theta}{M \cdot (1 + \tan^2\theta)} \quad (5)$$

When the relationship (5) is established, the basic periodic portion 10 can be constructed by repeating the dot data items which are arranged between the points A, B in the direction Y. More specifically, where the number of dot data items constituting the basic periodic portion 10 is selected such that an integral number of dot data items will be arranged between the points A, B, the basic periodic portion 10 can be represented by dot data items having a data amount of $\gamma/\alpha$ which is defined by the equation (5). For example, since $\tan\theta = \frac{1}{2}$ and M=2 in FIG. 3, $\gamma/\alpha$ becomes 1/5, and hence the basic periodic portion 10 can be represented by 20 dot data items $a_0$ through $a_{19}$ which have a data amount of 1/5.

A method of forming a halftone dot image signal from a continuous-tone image signal based on the dot data items $a_0$ through $a_{19}$ constituting the basic periodic portion 10 shown in FIG. 3 will be described below.

Figure 4:
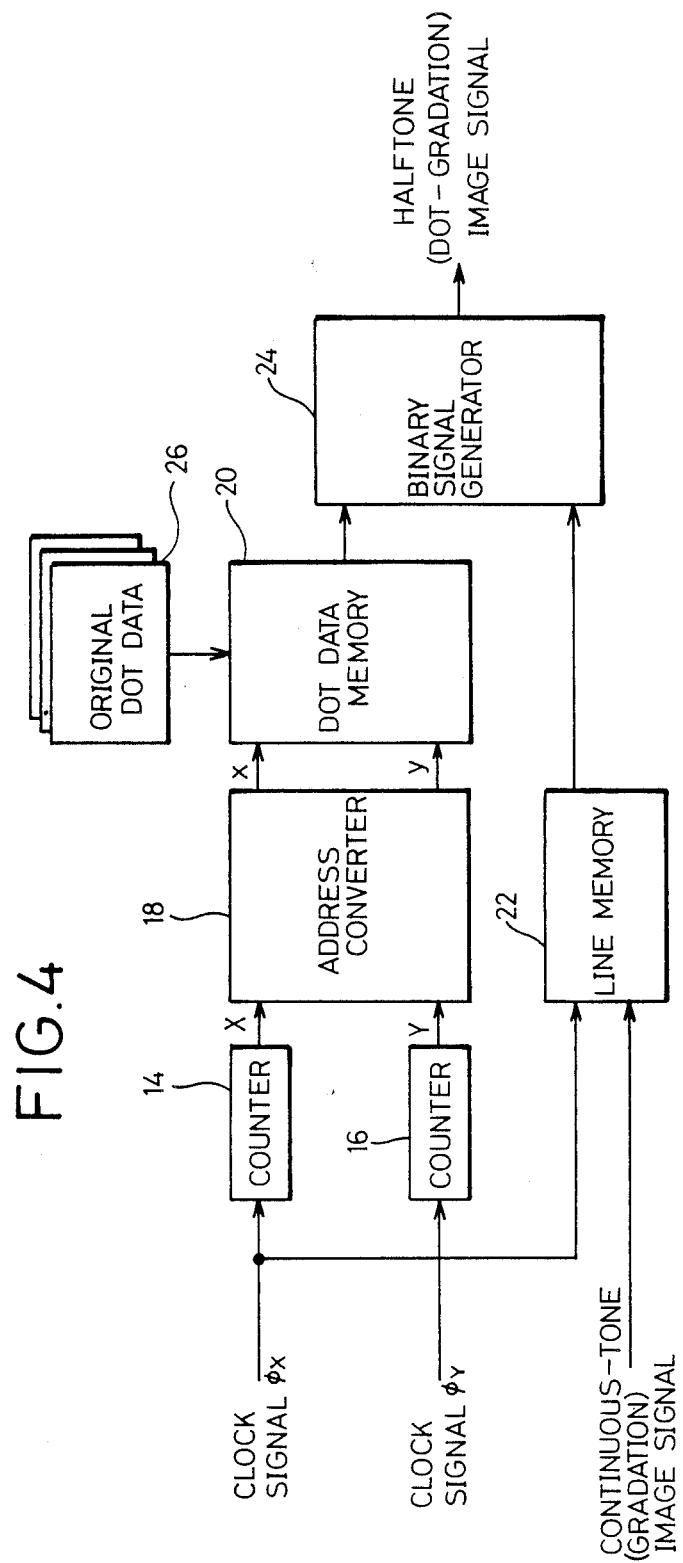
FIG. 4 is a block diagram of a halftone dot image signal generating circuit for carrying out the halftone screen forming method of the present invention.

FIG. 4 shows a halftone dot image signal generating circuit for generating a halftone dot image signal. The halftone dot image signal generating circuit has two counters 14, 16, an address converter 18, a dot data memory 20, a line memory 22, and a binary signal generator 24. The dot data memory 20 stores desired ones transferred out of a plurality of original dot data items 26 including minimum unit dot data items $a_0$ through $a_{19}$ which have been established beforehand dependent on the screen angle $\theta$ and a dot resolution.

The counter 14 counts a clock signal $\phi_X$ of the continuous-tone image in the main scanning direction and supplies the count as an address signal X to the address converter 18. The counter 16 counts a clock signal $\phi_Y$ of the continuous-tone image in the auxiliary scanning direction and supplies the count as an address signal to the address converter 18.

Figure 5:
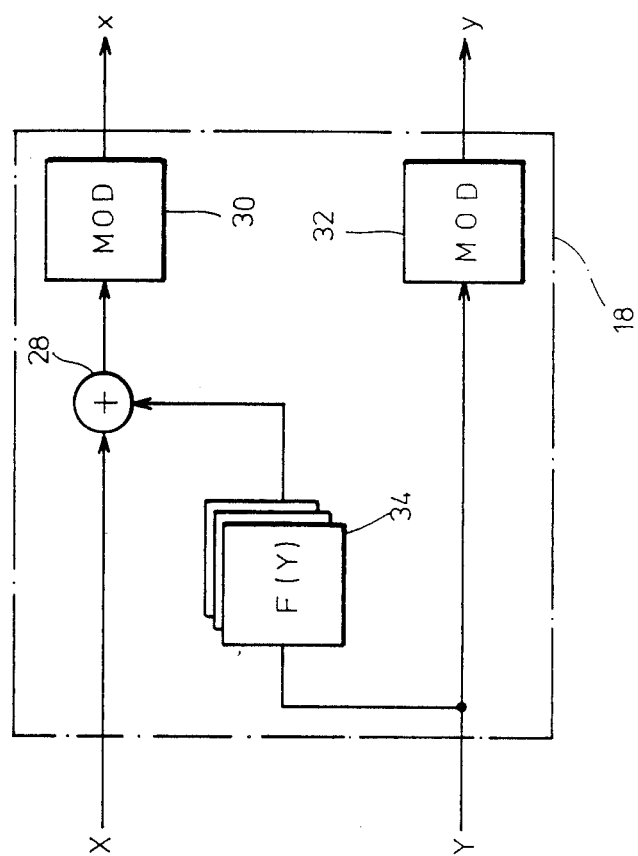
FIG. 5 is a block diagram of an address converter in the circuit illustrated in FIG. 4.

The address converter 18 converts the address signals X, Y f dot data items in the basic periodic portion 10 into address signals x, y for the dot data items $a_0$ through a stored in the dot data memory 20. As illustrated in FIG. 5, the address converter 18 has a modulo calculating unit 30 supplied with the address signal X through an adder 28 a modulo calculating unit 32 supplied with the address signal Y. The adder 28 is supplied with an addition signal F(Y) selected by the address signal Y from an offset 34. The offset table 34 is composed of a plurality items which are determined by combinations of screen angles $\theta$ and dot resolution levels. The modulo calculating unit 30 calculates the address signal x according to the equation:

$$x = MOD(X + F(Y), N_X) \quad (6)$$

where $N_X$ is the number of dot data items of the basic periodic portion 10 in the direction X. The modulo calculating unit 32 calculates the address signal y according to the equation:

$$y = MOD(Y, N_Y) \quad (7)$$

where $N_Y$ is the number of dot data items of the basic periodic pattern 10 in the direction Y.

The line memory 22 is supplied with the continuous tone image signal and the clock signal $\phi_X$ in the main scanning direction. Output signals from the dot data memory 20 and the line memory 22 are applied to the binary signal generator 24. The binary signal generator 24 compares the dot data items and the image signal, and the result of comparison the is issued as a halftone dot image signal.

Figure 6:
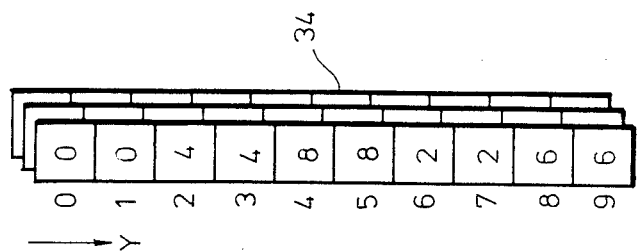
FIG. 6 is a view of an offset table in the address converter shown in FIG. 5.

The continuous-tone image signal is converted into the halftone dot image signal, using the basic periodic portion 10 shown in FIG. 3, as follows:

The original dot data items 26 contain dot data items dependent on screen angles $\theta$ and dot resolution levels. Out of these dot data items, the dot data items $a_0$ through $a_{19}$ are selected and loaded into the dot data memory 20 at addresses (x, y) which range from (0, 0) to (9,1). Based on the clock signals $\phi_X$, $\phi_Y$, the address signals X, Y are applied to the address converter 18, which then converts the address signals X, Y into the address signals x, y for the dot data items $a_0$ through $a_{19}$. When (X, Y)=(0, 0), for example, since the addition signal F(Y) is set to 0 in the offset table 34 shown in FIG. 6, the output signals x, y from the modulo calculating units 30, 32 are 0, 0, respectively, as calculated by the equations (6), (7). Therefore, the address converter 18 accesses the dot data item $a_0$ stored in the dot data memory 20 at the address (x, y)=(0, 0), and supplies the dot data item $a_0$ to the binary signal generator 24. When the address signals X, Y from the counters 14, 16 represent an address (0,2), for example, the addition signal F(Y) is 4 as shown in FIG. 6, and hence the address (x, y) becomes (4,0) according to the equations (6), (7). The address converter 18 thus selects the dot data item $a_4$ out of the dot data items $a_0$ through $a_{19}$ stored in the dot data memory 20, and supplies the selected dot data item $a_4$ to the binary signal generator 24. Likewise, the dot data items $a_0$ through $a_{19}$ constituting the basic periodic portion 10 are successively supplied to the binary signal generator 24.

The binary signal generator 24 is supplied with the continuous-tone image signal stored in the line memory 22 in timed relation to the clock signal $\phi_X$, as well as the dot data items $a_0$ through $a_{19}$. The binary signal generator 24 compares the dot data items $a_0$ through $a_{19}$ with the continuous-tone image signal, and issues the result of comparison as an on/off halftone dot image signal. The halftone dot image signal is then converted into a light signal such as a laser beam, for example, to form a halftone dot image on a film.

Figure 7:
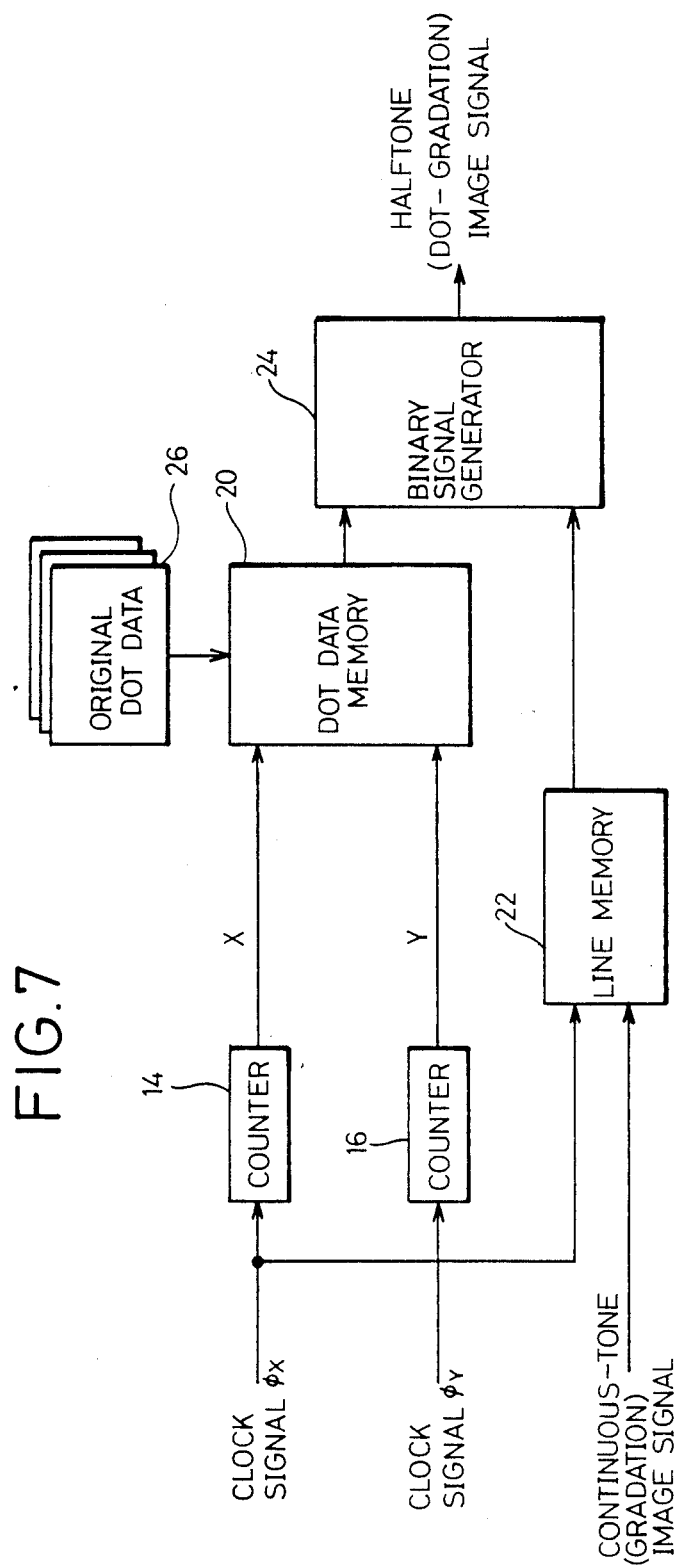
FIG. 7 is a block diagram of a halftone dot image signal generating circuit according to another embodiment for carrying out the halftone screen forming method of the present invention.

In the above embodiment, the address converter 18 generates the address signals x, y for the dot data items stored in the dot data memory 20. However, it is possible to obtain desired dot data items without employing the address converter 18 as shown in FIG. 7. More specifically, the dot data memory 20 shown in FIG. 7 fetches a dot data item from the original dot data items 26 according to an algorithm defined by the equations (6), (7), and stores the dot data item therein at a desired address. The dot data memory 20 then supplies the binary signal generator 24 with a dot data item based on the address signals X, Y from the counters 14, 16. The halftone dot image signal generating circuit of FIG. 7 is of a simpler arrangement.

With the present invention, as described above, when converting a continuous-tone image signal into a halftone dot image signal based on halftone screen signals, minimum unit dot data items are generated dependent on a screen angle and a dot resolution level, and are successively extracted in a sequence based on the screen angle and the dot resolution level for thereby forming the halftone screen signals which constitute a basic periodic portion. Therefore, since it is not necessary to prepare all dot data items constituting the basic periodic portion, the data storage capacity required is reduced and the cost of forming a halftone screen is lowered. The time required to prepare dot data items is greatly shortened, and the apparatus used to form a halftone dot image is manufactured inexpensively.

Although a certain preferred embodiment has been shown and described, it should be understood that many changes and modifications may be made therein without departing from the scope of the appended claims.

What is claimed is:

1. A method of forming a halftone screen in converting a continuous-tone image into a halftone dot image based on halftone screen signals by defining a screen angle as a rotational tangent thereof to establish a basic periodic portion of the halftone screen signals and periodically generating the basic period portion to cover an entire scanned region of the continuous-tone image, said method comprising the steps of:

preparing minimum unit dot data items necessary to define said basic period portion as determined by a screen angle and a dot resolution level; and generating said dot data items in a sequence of address signals X, Y which is established based on said screen angle and said dot resolution level to constitute said basic periodic portion;

wherein said dot data items represented by address signals X, Y are converted into dot data items represented by address signals x, y which are defined by:

$$x = MOD(X + F(Y), N_x)$$

$$y = MOD(Y, N_y)$$

where $N_x$, $N_y$ are numbers of dot data items of said basic periodic portion in directions X, Y, respectively, F(Y) is an address offset number with respect to the address signal Y, and MOD is a modulo operator.

2. A method according to claim 1, wherein the dot data items are stored in memory means, said basic periodic portion being constructed by fetching the stored dot data items from said memory means in an address sequence which is established based on predetermined address conversion data.

3. A method according to claim 2, wherein desired dot data items are selected out of a plurality of dot data items which are established based on the screen angle and the dot resolution level and are stored in said memory means.

4. A method of forming halftone screen in converting a continuous-tone image into a halftone dot image based on halftone screen signals by defining a screen angle as a rational tangent thereof to establish a basic periodic portion of the halftone screen signals and periodically generating the basic periodic portion to cover an entire scanned region of the continuous-tone image, said method comprising the steps of:

preparing minimum unit dot data items necessary to define a basic periodic portion as determined by a screen angle and a dot resolution level; and generating said dot data items in a sequence which is established based on said screen angle and said dot resolution level to constitute said basic periodic portion;

wherein said basic periodic portion includes a dot composed of an integral number of dot data items; and wherein said dot comprises four respective points defined at corners thereof, and wherein a vertical distance l between an uppermost point and a leftmost point of said dot is defined as follows:

$$l = L \cos^2 \theta \cdot \tan \theta$$

where $\theta$ equals said screen angle and L equals the length of a marginal edge of said basic periodic portion onto which a side of said dot is projected.

5. A method according to claim 4, wherein the dot data items are stored in memory means, said basic periodic portion being constructed by fetching the stored dot data items from said memory means in an address sequence which is established based on predetermined address conversion data.

6. A method according to claim 5, wherein desired dot data items are stored out of a plurality of dot data items which are established based on the screen angle and the dot resolution level and are stored in said memory means.

* * * * *